(12) United States Patent
Morkovine et al.

(10) Patent No.: US 12,069,136 B2
(45) Date of Patent: *Aug. 20, 2024

(54) ACTIVITY-BASED APPLICATION RECOMMENDATIONS

(71) Applicant: Box, Inc., Redwood City, CA (US)

(72) Inventors: Daniel Wayne Morkovine, San Carlos, CA (US); Michelle Sangeun Oh, San Francisco, CA (US); Faizan N. Buzdar, Redwood City, CA (US); Derrik R. Lansing, North Ogden, UT (US); Christopher Tucker, San Francisco, CA (US); Victoria Wee, Coquitlam (CA); Prachi Subhash Jadhav, Emerald Hills, CA (US); Dhiraj Sekhri, Santa Clara, CA (US); Pal Ramanathan, Foster City, CA (US)

(73) Assignee: Box, Inc., Redwood City, CA (US)

( * ) Notice: Subject to any disclaimer, the term of this patent is extended or adjusted under 35 U.S.C. 154(b) by 27 days.

This patent is subject to a terminal disclaimer.

(21) Appl. No.: 17/817,968

(22) Filed: Aug. 5, 2022

(65) Prior Publication Data

US 2023/0094015 A1 Mar. 30, 2023

Related U.S. Application Data

(63) Continuation of application No. 16/552,884, filed on Aug. 27, 2019, now Pat. No. 11,412,049.
(Continued)

(51) Int. Cl.
*G06F 16/00* (2019.01)
*G06F 9/451* (2018.01)
(Continued)

(52) U.S. Cl.
CPC ............ *H04L 67/141* (2013.01); *G06F 9/451* (2018.02); *G06F 16/9535* (2019.01);
(Continued)

(58) Field of Classification Search
CPC ............ G06F 16/24578; G06F 16/285; G06F 16/90324; G06F 16/9535; G06F 16/245;
(Continued)

(56) References Cited

U.S. PATENT DOCUMENTS

| | | |
|---|---|---|
| 7,640,506 B2 | 12/2009 | Pratley et al. |
| 7,665,098 B2 | 2/2010 | Kavalam |

(Continued)

FOREIGN PATENT DOCUMENTS

CN 101 404 696 A 4/2009

OTHER PUBLICATIONS

Non-final Office Action dated Jun. 23, 2020 for U.S. Appl. No. 16/552,993.
(Continued)

*Primary Examiner* — Shyue Jiunn Hwa
(74) *Attorney, Agent, or Firm* — Vista IP Law Group, LLP

(57) ABSTRACT

Methods, systems and computer program products for shared content management systems. In a content management system that supports multiple applications that operate on shared documents, multiple modules are operatively interconnected to make and present activity-based application recommendations. Techniques for making activity-based application recommendations include recording a series of interaction events from multiple users, which events correspond to a series of interactions performed by a plurality of applications over a shared content object. Constituent interaction events from the series of interactions are analyzed to determine a set of recommended applications.

(Continued)

The set of recommended applications is presented to a user in a dynamically-populated user interface.

20 Claims, 10 Drawing Sheets

Related U.S. Application Data

(60) Provisional application No. 62/723,336, filed on Aug. 27, 2018.

(51) Int. Cl.
| | | |
|---|---|---|
| G06F 16/9535 | (2019.01) | |
| G06F 16/9536 | (2019.01) | |
| G06F 16/955 | (2019.01) | |
| G06F 21/62 | (2013.01) | |
| H04L 65/1083 | (2022.01) | |
| H04L 65/401 | (2022.01) | |
| H04L 65/403 | (2022.01) | |
| H04L 67/141 | (2022.01) | |
| H04L 67/50 | (2022.01) | |
| H04L 67/10 | (2022.01) | |

(52) U.S. Cl.
CPC ...... *G06F 16/9536* (2019.01); *G06F 16/9558* (2019.01); *G06F 21/629* (2013.01); *H04L 65/1083* (2013.01); *H04L 65/4015* (2013.01); *H04L 65/403* (2013.01); *H04L 67/535* (2022.05); *H04L 67/10* (2013.01)

(58) Field of Classification Search
CPC .. G06F 16/2465; G06F 16/248; G06F 16/254; G06F 16/9024; G06F 16/951; G06F 16/9537; G06F 18/2323; G06F 21/6254; G06F 21/6263; G06F 40/134; G06F 9/451; G06F 16/176; G06F 40/169; G06F 8/61; G06F 16/1734; G06F 16/9536; G06F 18/251; G06F 18/285; G06F 21/629; G06F 40/197; G06F 9/4411; G06F 9/44505; G06F 9/453; G06F 9/5027; G06F 11/3438; G06F 16/00; G06F 16/1834; G06F 16/2428; G06F 16/955; G06F 16/958; G06F 21/128; G06F 3/04812; G06F 3/04842; G06F 3/04847; G06F 3/0486; G06F 40/103; G06F 40/117; G06F 40/194; G06F 8/31; G06F 8/72; G06F 8/74

See application file for complete search history.

(56) References Cited

U.S. PATENT DOCUMENTS

| | | | |
|---|---|---|---|
| 8,468,164 | B1 | 6/2013 | Paleja et al. |
| 8,484,292 | B2 | 7/2013 | Spataro |
| 8,838,956 | B2 | 9/2014 | Bettger et al. |
| 9,148,425 | B2 | 9/2015 | Rowe et al. |
| 9,489,695 | B1 | 11/2016 | Branson |
| 9,756,094 | B1 * | 9/2017 | Lewis .................... H04L 65/612 |
| 10,474,416 | B1 | 11/2019 | Farivar |
| 10,509,850 | B2 | 12/2019 | Abrahami |
| 10,693,748 | B2 | 6/2020 | Doggett et al. |
| 10,740,297 | B2 | 8/2020 | Knotts et al. |
| 10,846,470 | B2 | 11/2020 | Nguyen et al. |
| 11,405,468 | B2 | 8/2022 | Morkovine et al. |
| 11,537,623 | B2 * | 12/2022 | Gao .................. G06F 16/24578 |
| 11,558,191 | B2 * | 1/2023 | Luce .................. G06Q 30/0202 |
| 11,562,170 | B2 * | 1/2023 | Edge .................... G06F 16/245 |
| 11,582,292 | B2 * | 2/2023 | Brewer .................. H04L 67/14 |
| 2002/0082998 | A1 | 6/2002 | Sastri et al. |
| 2002/0091560 | A1 | 7/2002 | Suzuki |
| 2004/0267877 | A1 | 12/2004 | Shapiro |
| 2006/0053380 | A1 | 3/2006 | Spataro |
| 2006/0101022 | A1 | 5/2006 | Yu et al. |
| 2007/0050449 | A1 | 3/2007 | Beck |
| 2008/0052358 | A1 | 2/2008 | Beaven et al. |
| 2008/0235277 | A1 | 9/2008 | Mathew |
| 2012/0101966 | A1 | 4/2012 | Van et al. |
| 2012/0173346 | A1 * | 7/2012 | Steelberg ............... G06Q 30/02 717/176 |
| 2012/0192055 | A1 | 7/2012 | Antebi et al. |
| 2013/0073568 | A1 * | 3/2013 | Federov .............. G06F 16/9535 707/E17.069 |
| 2013/0318627 | A1 | 11/2013 | Lundkvist |
| 2014/0236649 | A1 | 8/2014 | Hamid et al. |
| 2015/0382039 | A1 | 12/2015 | Lewis et al. |
| 2016/0148157 | A1 | 5/2016 | Walia |
| 2016/0188733 | A1 * | 6/2016 | Glover ............... G06Q 30/0275 707/738 |
| 2016/0216947 | A1 | 7/2016 | Hassibi et al. |
| 2017/0048285 | A1 | 2/2017 | Ameesh et al. |
| 2017/0323325 | A1 * | 11/2017 | Hamedi ............. H04L 67/1072 |
| 2017/0329466 | A1 | 11/2017 | Krenkler et al. |
| 2017/0329468 | A1 | 11/2017 | Schon et al. |
| 2017/0351388 | A1 | 12/2017 | Grunewald et al. |
| 2018/0139294 | A1 | 5/2018 | Ju et al. |
| 2018/0373575 | A1 | 12/2018 | Chen |
| 2019/0026663 | A1 | 1/2019 | Homeyer et al. |
| 2019/0036981 | A1 | 1/2019 | Thippesh |
| 2019/0108044 | A1 | 4/2019 | Coven et al. |
| 2019/0108418 | A1 | 4/2019 | Coven et al. |
| 2019/0236547 | A1 | 8/2019 | Huang |
| 2019/0238619 | A1 | 8/2019 | Mantrana-Exposito |
| 2020/0065343 | A1 | 2/2020 | Morkovine |
| 2020/0068026 | A1 | 2/2020 | Morkovine |
| 2020/0134518 | A1 | 4/2020 | Bakshi |
| 2021/0120053 | A1 | 4/2021 | Shin et al. |
| 2022/0141265 | A1 | 5/2022 | Leland et al. |
| 2023/0024182 | A1 | 1/2023 | Morkovine et al. |

OTHER PUBLICATIONS

Notice of Allowance dated Dec. 7, 2020 for U.S. Appl. No. 16/552,993.

International Search Report and Written Opinion dated Dec. 18, 2019 for PCT Appln. No. PCT/US19/48436.

"Activity stream", Wikipedia, URL:"https://en.wikipedia.org/wiki/Activity_stream", Feb. 2018.

"Dropbox and Slack: removing friction from workplace collaboration", Slack.com, URL:"https://slack.com/blog/collaboration/dropbox-and-slack-removing-friction-from-workplace-collaboration", Jul. 25, 2019.

"Gsuite Updates: View your Slack activity from within Google Drive", G Suite Updates Blog, URL:https://workspaceupdates.googleblog.com/2018/01/view-your-slack-activity-from-within.html, Jan. 31, 2018.

"Meet the new Dropbox", Dropbox Team, URL:https://blog.dropbox.com/topics/product-tips/new-dropbox, Jun. 11, 2019.

Tata, Sandeep, et al. "Quick access: building a smart experience for Google drive." Proceedings of the 23rd ACM SIGKDD International Conference on Knowledge Discovery and Data Mining. 2017.

Non-final Office Action dated Mar. 16, 2021 for U.S. Appl. No. 16/552,884.

Notice of allowance dated Sep. 9, 2021 for U.S. Appl. No. 16/552,884 (no refs).

Notice of Allowance dated Jul. 21, 2021 for U.S. Appl. No. 16/552,993.

Vom Slack-Team, "6 ways to use Google Drive Bot's newest features", Aug. 15, 2018, https://slack.com/intl/de-de/blog/productivity/6-ways-to-use-google-drive-bots-newest-features (Year: 2018).

Google.com, "Let users see file activity (Activity dashboard)", Jan. 9, 2019, https://support.google.com/a/answer/7573825?hl=en (Year: 2019).

European Search Report dated Jul. 22, 2021 for EP Applcation No. 19 85 5932.

(56) References Cited

OTHER PUBLICATIONS

Translation of CN 101404696A retrieved from Google Patents.
Notice Of Allowance dated Mar. 16, 2022 for U.S. Appl. No. 16/552,993.
Non-Final Office Action dated Feb. 7, 2023 for U.S. Appl. No. 17/816,677.
Notice of Allowance for U.S. Appl. No. 17/816,677 dated Jun. 14, 2023.

* cited by examiner

ACTIVITY-BASED APPLICATION RECOMMENDATIONS

CROSS-REFERENCE TO RELATED APPLICATION(S)

The present application is a continuation of U.S. application Ser. No. 16/552,884, filed on Aug. 27, 2019, which claims the benefit of priority to U.S. Patent Application Ser. No. 62/723,336 titled "COLLABORATION SYSTEM FEEDS", filed on Aug. 27, 2018 which is hereby incorporated by reference in its entirety.

FIELD

This disclosure relates to shared content management systems, and more particularly to techniques for activity-based application recommendations.

BACKGROUND

Cloud-based content management services and systems have impacted the way personal and corporate computer-readable content objects (e.g., documents, spreadsheets, images, programming code files, etc.) are stored, and has also impacted the way such personal and corporate content objects are shared and managed. Content management systems provide an ability to securely share large volumes of content objects among trusted users (e.g., collaborators) on a variety of user devices such as mobile phones, tablets, laptop computers, desktop computers, and/or other devices.

In some systems, sharing and collaboration activities include one or more interactions (e.g., authoring, editing, viewing, etc.) that are performed over the content objects. In some cases, such interactions are organized into workflows. The interactions and/or workflows may be performed by one user, multiple users, and/or even autonomously by one or more computing entities (e.g., processes, agents, applications, etc.). Many content management systems provide a native application (e.g., browser portal, mobile application, etc.) that can be accessed by its users to facilitate interactions. In some cases, certain interactions with a particular content object managed by a content management system are performed by one or more third-party applications, rather than at the native application of the system.

Third-party applications are often used to improve the efficiency of the interactions performed over the content objects. A third-party application may be selected from the hundreds of third-party applications available in a computing environment for a variety of reasons such as the familiarity and/or proficiency of users with the application; the popularity and/or functionality of the application as pertains to a particular content object type and/or a particular interaction (e.g., operation) over that content object type; and/or for other reasons. In the face of so many third-party applications that are related in some way to a particular user and/or a particular content object or content object type, users desire to know which third-party applications can best deliver such improved interaction efficiencies. Moreover, users do not want to spend the time to hunt and peck through a vast trove of potential third-party applications in order to select a particular one of the third-party applications.

Unfortunately, simplistic mechanisms such as associating an application with a file type are deficient. Moreover, there are no mechanisms for informing a user of the third-party applications that the user can access to facilitate particular types of interactions with a particular content object. In some content management systems, for example, a fixed set of third-party applications may be presented to a user in a native application. However, in many cases, some or all of the entries in this fixed set of applications may not be useful for the particular types of interactions associated with the content object being accessed by the user. In other cases, the user is tasked with determining which third-party application from the hundreds of available applications might best facilitate a certain interaction corresponding to a particular content object. What is needed is a way of presenting to a user the one or more third-party applications most relevant to facilitating particular types of interactions with a particular content object.

SUMMARY

The present disclosure describes techniques used in systems, methods, and in computer program products for making activity-based application recommendations, which techniques advance the relevant technologies to address technological issues with legacy approaches. More specifically, the present disclosure describes techniques used in systems, methods, and in computer program products for recommending applications to be used for interaction with content objects. Certain embodiments are directed to technological solutions for analyzing a history of application usage activity to dynamically determine a set of applications that are recommended for particular users and/or particular content objects.

The disclosed embodiments modify and improve over legacy approaches. In particular, the herein-disclosed techniques provide technical solutions that address the technical problems attendant to identifying one or more applications from a large corpus of available applications to perform operations over certain content objects. Such technical solutions involve specific implementations (i.e., data organization, data communication paths, module-to-module interrelationships, etc.) that relate to the software arts for improving the functionality of computers.

The ordered combination of steps of the embodiments serve in the context of practical applications that perform steps for analyzing application usage activity to dynamically determine a set of applications that are recommended for particular users and/or particular content objects. As such, techniques for analyzing application usage activity to dynamically determine a set of applications that are recommended for particular users and/or particular content objects overcome heretofore unsolved technological problems associated with identifying applicable applications from a large corpus of available applications.

Many of the herein-disclosed embodiments employ technological solutions for analyzing application usage activity to dynamically determine a set of applications that are recommended for a particular user and/or for a particular content object. These technological solutions pertain to technological problems that arise in the hardware and software arts that underlie modern distributed processing systems. Aspects of the present disclosure achieve performance and other improvements in peripheral technical fields including (but not limited to) human-machine interfaces and cross-entity distributed processing systems.

Various embodiments implement techniques for determining activity-based application recommendations. Aspects of the techniques include recording a series of interaction events from multiple users that correspond to a series of interactions performed by the multiple users using a plurality of applications over a shared content object; and then analyzing the series of interaction events to determine a set of recommended applications.

Some embodiments present at least a portion of the set of recommended applications to at least one user in a dynamically-populated user interface, and some embodiments present the set of recommended applications in a user interface of a native application that is accessed by at least one user. In this embodiment, the native application is provided as a component of a content management system that manages the shared content object, whereas other (e.g., third-party) applications are provided by an entity other than the entity that maintains the content management system.

The aforementioned user interface can be configured such that at least one of the one or more icons or one or more hyperlinks associated with the set of recommended applications are presented in a user interface of the native application. The recommended applications are determined based at least in part on scores assigned to the set of recommended applications, where the scores represent a quantitative measure of relevancy to the particular user. In some embodiments, the presentation of the set of recommended applications are determined based at least in part on one or more permissions constraints, where the one or more permissions constraints correspond to at least one of, at least one user and his or her role or permission level, or at least one of the plurality of applications, or permissions pertaining to the shared content object itself. In some embodiments, the set of recommended applications are determined based at least in part on an application activity graph, the application activity graph being constructed from at least a portion of the series of interaction events. In some cases, application programming interfaces are accessed by the applications to record at least some of the series of interaction events and/or to retrieve at least some of the series of interaction events. The series of interaction events can arise from multiple users who invoke user-to-user interactions and/or user-to-content interactions. Events can be associated with a time indication such that a given series of interaction events comprise some older timestamped interaction events followed in the series by some later timestamped interaction events.

In some embodiments certain of the user-to-user interactions and/or certain of the user-to-content interactions that comprise the interaction events can be designated as a user-level event, or as an "enterprise-level event", or as a "global-level event", and such interaction events can be added into an application activity graph. In certain embodiments, any one or more global-level events (e.g., events that are raised by any user who is considered to be an external user) can be scored with a weight that is either greater than or less than a weight of a different type of interaction event. Such scored events can be used for sorting the applications so as to present (e.g., in a user interface) the applications that are most relevant to the context in order of descending relevance.

In various embodiments, any combinations of any of the above can be combined to perform acts pertaining to forming activity-based application recommendations, and many such combinations of aspects of the above elements are contemplated.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
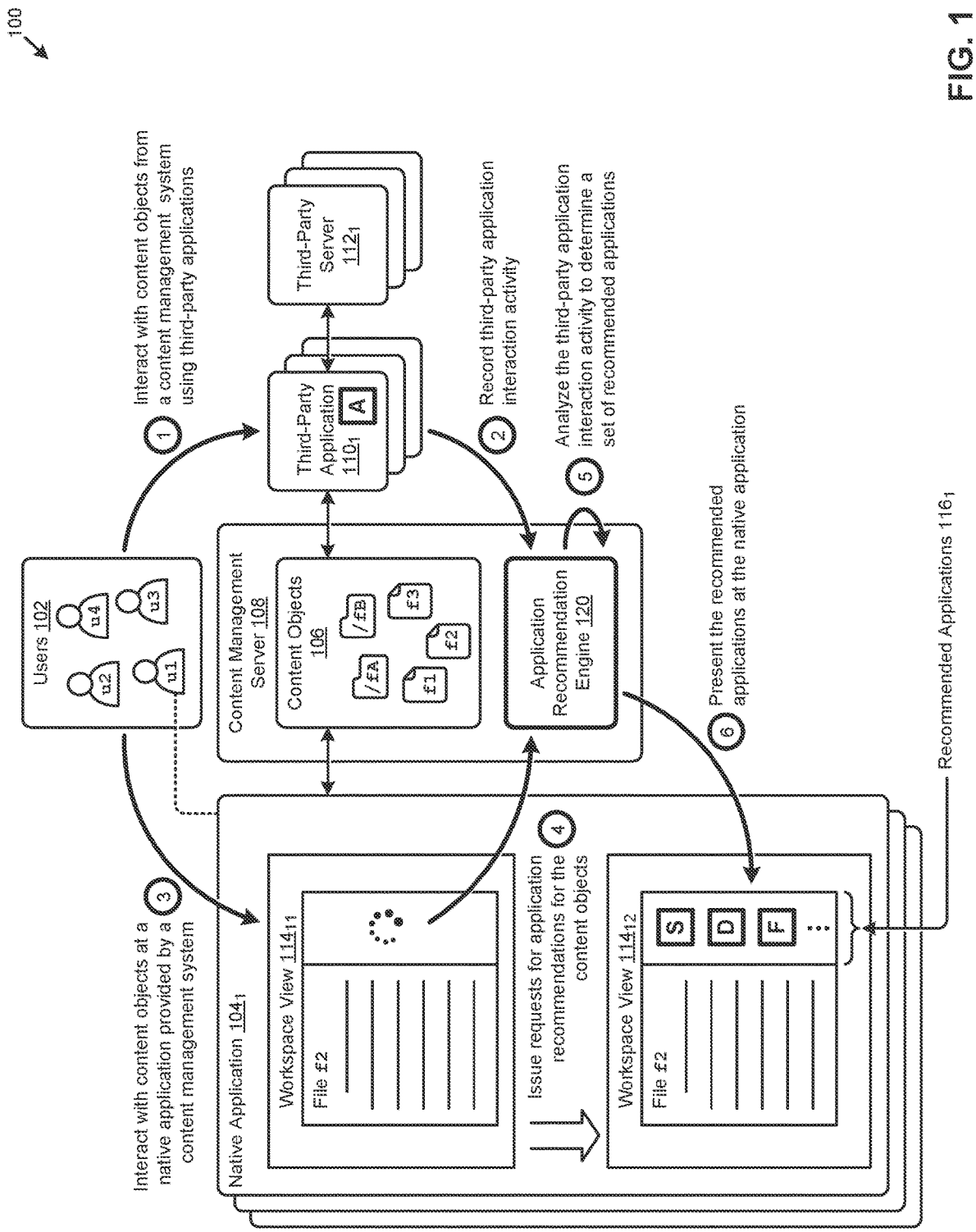
FIG. 1 illustrates a computing environment in which embodiments of the present disclosure can be implemented.

Aspects of the present disclosure solve problems associated with identifying one or more applications from a large corpus of available applications to perform operations over certain content objects. These problems are unique to, and may have been created by, computer-implementations of collaboration systems that perform operations over certain content objects in the context of cross-entity distributed processing systems. Some embodiments are directed to approaches for analyzing historical application usage activities so as to dynamically determine a set of recommended applications to present to a particular user. The accompanying figures and discussions herein present example environments, systems, methods, and computer program products for recommending applications to facilitate a user's interactions with content objects.

Overview

Disclosed herein are techniques for analyzing application usage activity to dynamically determine a set of applications that are recommended for a particular user and/or for a particular content object. In certain embodiments, the techniques are implemented in a computing environment comprising a content management system that facilitates interactions by a plurality of users over a plurality of content objects. The content management system provides a native application (e.g., browser portal, mobile application, etc.) that is accessed by its users to facilitate certain interactions (e.g., authoring, editing, viewing, etc.) with the content objects. The users may also interact with the content objects using third-party applications that are available in the overall computing environment. Such third-party applications are applications that are not provided and/or maintained by the content management system but rather, are applications that are integrated with the content management system to facilitate certain interactions with at least some of the types of content objects managed at the content management system.

When multiple users (e.g., collaborators) interact with these content objects using the third-party applications, the corresponding interaction events are recorded at the content management system. As used herein, interaction events are data elements that describe a time-sequenced tracking history of user actions taken over one or more content objects. Such a history of user actions taken over one or more content objects can comprise user actions that are raised either at or by operation of a native application or raised at or by operation of a third-party application. More specifically, to accommodate making recommendations of one or more applications from a group of third-party applications, a series of timestamped interaction events associated with the third-party applications are processed to construct application activity graphs. As used herein, the application activity graphs describe the logical relationships (e.g., graph edges) between various entities (e.g., graph nodes), where the entities can correspond to the third-party applications, the content objects, the users, and/or other entities associated with the computing environment.

At various moments in time, the application activity graphs are analyzed to identify a set of recommended applications from the third-party applications. For example, when a user accesses a particular content object at the native application, a request is issued from the native application to consider applications that are relevant to that particular user and/or are relevant to that particular content object. Some of the considered applications are then presented as recommendations to the user at the user interface of the native application. In certain embodiments, the recommended applications are selected based at least in part on various permissions constraints associated with the users and/or content objects and/or third-party applications. In certain embodiments, the recommended applications are selected based at least in part on scores derived from the application activity graphs and assigned to respective ones of the third-party applications.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 illustrates a computing environment 100 in which embodiments of the present disclosure can be implemented. As an option, one or more variations of computing environment 100 or any aspect thereof may be implemented in the context of the architecture and functionality of the embodiments described herein.

FIG. 1 illustrates techniques for analyzing application usage activity to dynamically determine a set of applications that are recommended for particular users and/or particular content objects. Specifically, the figure presents a logical depiction of how the herein disclosed techniques can be used to determine sets of recommended applications based at least in part on interactions with content objects performed over a plurality of applications. A representative set of high order operations are also presented to illustrate how the herein disclosed techniques might be applied in computing environment 100.

The logical depiction of FIG. 1 depicts a representative set of users 102 (e.g., user "u1", user "u2", user "u3", and user "u4") who desire to interact with various instances of content objects 106 (e.g., folder "fA", folder "fB", file "f1", file "f2", and file "f3") managed at a content management server 108. Users 102 may be users of a content management system that facilitates interactions (e.g., authoring, editing, viewing, etc.) over content objects 106 for sharing, collaboration, and/or other purposes. In some cases, such interactions are organized into workflows. Interactions and/or workflows over a particular content object may be performed by one or more users 102 and/or even autonomously by one or more computing entities (e.g., processes, agents, applications, etc.). As shown, the content management system provides instances of a native application that can be accessed by respective ones of the users 102 to facilitate a user's interactions with content objects 106 and/or with one another. As an example, native application $104_1$ might be a browser portal or mobile application accessed by user "u1" to interact with file "f 2" from content objects 106 and/or interact with other users from users 102.

As can be observed, a plurality of third-party applications is also accessible by users 102 to interact with content objects 106 and/or other users. For example, third-party application $110_1$ might be an application (e.g., web application, mobile application, etc.) served by a third-party server $112_1$ and accessed by some or all of users 102 to perform such interactions. In this case, the applications referred to as "third-party applications" are applications that are being provided (e.g., developed, delivered, served, maintained, etc.) by an entity (e.g., the owner of third-party server $112_1$) other than the entity (e.g., content management system provider) managing the content management server 108. While such third-party applications are applications that are not provided and/or maintained by the content management system, such applications may still be integrated with the content management system to facilitate certain interactions with at least some of the types of content objects 106 managed at the content management system (e.g., at content management server 108). Such integration may include registration of the applications with the content management system, establishment of application programming interfaces (APIs) to facilitate communication between the applications and the content management system, and/or other integration capabilities.

As earlier mentioned, the third-party applications can improve the efficiency of the interactions performed over content objects 106. A third-party application (e.g., third-party application $110_1$) may be selected from the hundreds of third-party applications available in computing environment 100 for a variety of reasons such as the familiarity and/or proficiency of users with the application, the popularity and/or functionality of the application as pertains to a particular content object type and/or a particular interaction (e.g., operation) over that content object type, and/or for other reasons. In the face of so many third-party applications that are related in some way to a particular user and/or a particular content object or content object type, users desire to know what third-party applications can best deliver such improved interaction efficiencies. For example, user "u1" may desire to know what third-party application or applications can best deliver interaction efficiencies over file "f2".

The herein disclosed techniques address such challenges pertaining to identifying one or more applications from a large corpus of available applications to perform operations over certain content objects at least in part by analyzing application usage activity to dynamically determine a set of applications that are recommended for a particular user and/or for a particular content object. In the embodiment of FIG. 1, the techniques are facilitated at least in part by an application recommendation engine 120 implemented at content management server 108. When users 102 interact with content objects 106 using the third-party applications (operation 1), the corresponding interaction activity is recorded by application recommendation engine 120 at content management server 108 (operation 2).

When a user accesses a particular content object at the native application (operation 3), a request is issued to application recommendation engine 120 from the native application to retrieve recommended applications that are relevant to that particular user and/or are relevant to that particular content object (operation 4). For example, user "u1" might access an instance of a native application to interact with file "f2". In response to a workspace view 114*ii* being presented, a request for a set of recommended applications associated with user "u1" and/or file "f 2" is issued to application recommendation engine 120.

The foregoing request invokes an analysis over the interaction activity associated with the third-party applications to determine a set of recommended applications (operation 5). In certain embodiments, the interaction events associated with the third-party application interaction activity are processed to construct various application activity graphs. As used herein, the application activity graphs describe the logical relationships (e.g., graph edges) between various entities (e.g., graph nodes), where the entities can correspond to the content objects, the users, or other entities, and the logical relationships can correspond to the third-party applications or other relationship characteristics (e.g., time). In response to a request for recommended applications, the application activity graphs are analyzed to identify a set of recommended applications for the request.

The recommended applications determined by the herein disclosed techniques are then delivered in accordance with the corresponding request. As an example, the set of recommended applications may be presented to a user at the user interface of the native application (operation 6). More specifically, a set of recommended applications $116_1$ represented by an "S" icon, a "D" icon, and an "F" icon are presented to user "u1" in a workspace view $114_{12}$ at native application $104_1$. In some cases, hyperlinks are added to the icons to facilitate efficient access to the recommended applications by the user. For example, a hyperlink that is associated with a particular recommended application icon might specify the URI of the content object corresponding to the request that was used as the basis for generating the set of recommended applications.

Figure 2:
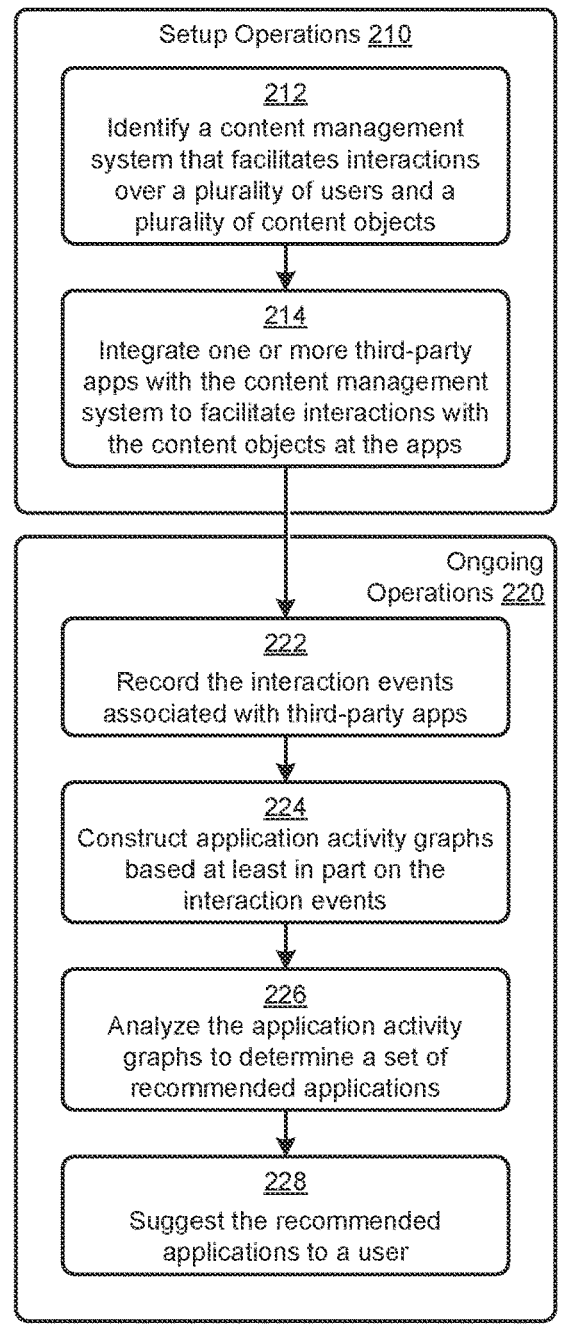
FIG. 2 depicts an activity-based application recommendation technique as implemented in systems that identify applications to facilitate a user's interactions with content objects, according to an embodiment.

FIG. 2 depicts an activity-based application recommendation technique 200 as implemented in systems that identify applications to facilitate a user's interactions with content objects. As an option, one or more variations of activity-based application recommendation technique 200 or any aspect thereof may be implemented in the context of the architecture and functionality of the embodiments described herein. The activity-based application recommendation technique 200 or any aspect thereof may be implemented in any environment.

FIG. 2 illustrates setup and ongoing operations that pertain to recording and analyzing application usage activity to dynamically determine a set of applications that are recommended for particular users and/or particular content objects. Specifically, the figure is presented to illustrate one embodiment of certain steps and/or operations performed over a network of devices (e.g., user devices, computing systems, etc.) to record and analyze interaction events. As can be observed, the steps and/or operations can be grouped into a set of setup operations 210 and a set of ongoing operations 220.

The setup operations 210 of activity-based application recommendation technique 200 commences by identifying a content management system that facilitates interactions over a plurality of users and a plurality of content objects (step 212). Such interactions can involve both user-to-user interactions and user-to-content interactions. One or more third-party applications (e.g., apps) are integrated with the content management system to facilitate interactions over the users and/or content objects performed at the apps (step 214). As an example, a contract document managed by the content management system might be shared using a first third-party application (e.g., SLACK™) to facilitate the development of the contract, which can then be submitted to a second third-party application (e.g., DOCUSIGN™) to facilitate execution (e.g., signing) of the contract. In this case, Slack and DocuSign might be registered with the content management system to facilitate authorized access to the contract document managed (e.g., stored, updated, etc.) at the content management system.

As depicted in the ongoing operations 220, any interaction events associated with third-party apps are recorded (step 222). Referring to the aforementioned example, the integration of Slack and DocuSign with the content management system might further involve the establishment of an API to record interaction events at the content management system that occur at these apps.

Application activity graphs are constructed from the recorded interaction events (step 224). The application activity graphs might be continuously constructed (e.g., created, updated, etc.) as interaction events are received, or constructed synchronous to receiving one or more instructions (e.g., requests). In either case, the application activity graphs are analyzed to determine sets of recommended applications (step 226) that are presented to one or more users (step 228). As described in more detail herein, a set of recommended applications often pertains to a particular user and/or particular content object or content object type. As an example, a set of recommended applications might be determined according to activity-based application recommendation technique 200 and/or other herein disclosed techniques in response to a request issued on behalf of a particular user who is interacting with a particular content object (e.g., at a native application). As used herein, a content object is any computer file or computer folder other computer data item that is able to be operated on by an application. The act of operating on a content object by an application may or may not modify the content object itself. In some cases, an application is able to operate on a content object by merely referring to the content object. Any operation by any user and/or by any application over any content object is deemed to be an interaction activity that has the potential to be used for making activity-based application recommendations.

Figure 3:
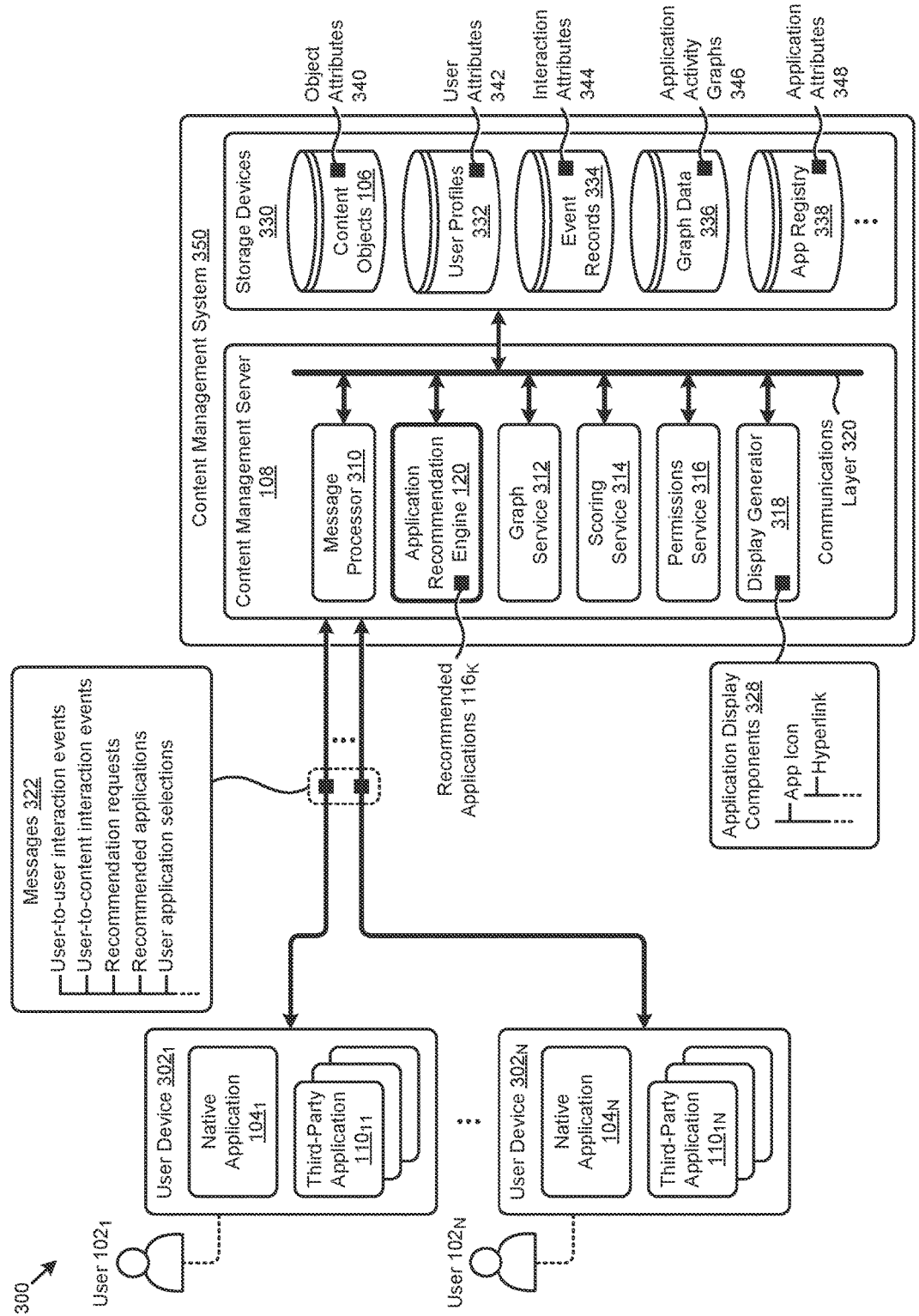
FIG. 3 presents a block diagram of a system that recommends applications to a user, according to an embodiment.

FIG. 3 presents a block diagram of a system 300 that recommends applications to a user. As an option, one or more variations of system 300 or any aspect thereof may be implemented in the context of the architecture and functionality of the embodiments described herein. The system 300 or any aspect thereof may be implemented in any environment.

FIG. 3 illustrates a system for analyzing application usage activity to dynamically determine a set of applications that are recommended for particular users and/or particular content objects. Specifically, the figure is being presented to show one embodiment of certain representative components and associated data structures and data flows implemented in a computing environment to facilitate the herein disclosed techniques. As shown, the components, data flows, and data structures are associated with a set of users (e.g., user $102_1$, . . . , user $102_N$) that interact with each other and a set of content objects 106 managed at a content management system 350. The components, data flows, and data structures shown in FIG. 3 present one partitioning and associated data manipulation approach. The specific example shown is purely exemplary, and other subsystems, data structures, and/or partitioning are reasonable.

As shown, system 300 comprises an instance of content management server 108 operating at content management system 350. Content management server 108 comprises a message processor 310, an application recommendation engine 120, a graph service 312, a scoring service 314, a permissions service 316, and a display generator 318. A plurality of instances of the foregoing components might operate at a plurality of instances of servers (e.g., content management server 108) at content management system 350 and/or any portion of system 300. Such instances can access each other (e.g., through a communications layer 320) and/or a set of storage devices 330 that store various information that facilitates the operation of the components of system 300 and/or any implementations of the herein disclosed techniques.

For example, content management server 108 might facilitate access to shared content in content objects 106 by the users (e.g., user $102_1$, . . . , user $102_N$) from a respective set of user devices (e.g., user device $302_1$, . . . , user device $302_N$). The content objects (e.g., files, folders, etc.) in content objects 106 are characterized at least in part by a set of object attributes 340 (e.g., content object metadata) stored at storage devices 330. Furthermore, the users are characterized at least in part by a set of user attributes 342 stored in a set of user profiles 332 at storage devices 330.

As shown, multiple users (e.g., user $102_1$ and user $102_N$) interact with instances of a native application (e.g., native application $104_1$, . . . , native application 104N) and/or instances of various third-party applications (e.g., third-party application $110_{11}$, . . . , third-party application $110_{1N}$) operating at their respective user devices. The respective user devices send or receive various instances of messages 322 that are received or sent by message processor 310 at content management server 108. In some cases, certain agents or applications (e.g., native application, third-party applications, etc.) operating at the user devices associated with the users might send or receive messages to or from content management server 108 without human interaction.

One class of messages 322 corresponds to interaction events that are invoked by the users when they interact with one another (e.g., user-to-user interactions) and/or when users interact with various content objects (e.g., user-to-content interactions). As described herein, some of such interactions are performed at the native application, which is provided by the provider of content management system 350, or some of such interactions are performed at one or more of the third-party applications, which third-party applications are provided by providers other than the provider of content management system 350. As examples, the users might log in to the native application or any of the third-party applications to interact with content objects they own or that are shared with them, to invite other users to collaborate on content objects, and/or to perform other collaboration activities. Any of the foregoing interactions or collaboration activities can be characterized as interaction events.

The message processor 310 at content management server 108 monitors the messages 322 to detect the interaction events performed over the plurality of users and/or the plurality of content objects. Message processor 310 codifies certain interaction attributes 344 pertaining to the interaction events in a set of event records 334 stored in storage devices 330. In some cases, message processor 310 will access the user attributes 342 (e.g., user identifiers, etc.) stored in user profiles 332 and/or the object attributes 340 (e.g., content object identifiers, etc.) stored in content objects 106 to facilitate populating the event records 334. The event records 334 and/or any other data described herein can be organized and/or stored using various techniques. For example, event records 334 might be organized and/or stored in a tabular structure (e.g., relational database table) that has rows that relate various interaction attributes with a particular interaction event. As another example, the event data might be organized and/or stored in a programming code object that has instances corresponding to a particular interaction event and properties that describe the various attributes associated with the event.

At certain moments in time, instances of messages 322 comprising recommendation requests are also received at message processor 310 from users and their user devices. Such recommendation requests are issued to retrieve a set of recommended applications that are determined according to the herein disclosed techniques. For example, in response to user $102_1$ loading a particular content object in native application $104_1$ at user device $302_1$, a recommendation request is issued from native application $104_1$ to return a set of recommended applications determined based at least in part on attributes associated with user $102_1$, the particular content object, and/or other entities. In response to receiving the recommendation requests, application recommendation engine 120 accesses the graph service 312 to form instances of application activity graphs 346 from the interaction attributes 344 of event records 334 and/or other information at content management system 350.

A set of graph data 336 stored at storage devices 330 codifies the attributes of application activity graphs 346. For example, graph data 336 codifies the entities (e.g., nodes) and entity relationships (e.g., edges) of the graphs and/or other entity attributes and entity relationship attributes (e.g., scores, weights, strengths, etc.) associated with the graphs. As used herein, the entity relationships of application activity graphs 346 correspond to applications (e.g., native application, third-party applications, etc.) and the entities of application activity graphs 346 correspond to the users or content objects associated with those applications.

When a particular application activity graph is constructed (e.g., in response to a recommendation request), application recommendation engine 120 accesses the scoring service 314 to assign scores to the applications associated with the particular application activity graph. Each score is a quantitative measure of the relevance of a particular application to the context of the recommendation request, which context is characterized by certain attributes (e.g., user attributes, object attributes, interaction attributes, etc.) associated with the recommendation request. As such, the scores can be used to sort and/or rank the applications to determine the applications that are most relevant to the context (e.g., users, content objects, contemporaneous interaction events, etc.) of the recommendation request.

The timing and/or order of the creation date of a content object, and/or the timing and/or order of any series of interaction events contributes to the scoring and ranking of the applications that are determined to be most relevant in the then-current context. More particularly, the timing and order of two or more interaction events at two or more different applications can influence or determine the scoring, as well as the order of presentation of the recommended applications. For example, an older timestamped interaction event over a document using a third-party application for messaging (e.g., Slack) followed by a newer timestamped interaction event over the same document using a third-party application for document signing (e.g., DocuSign) might result in the document signing application being the highest scoring application, whereas an older timestamped interaction event over a document using a third-party application for document signing (e.g., DocuSign) followed by a newer timestamped interaction event over the same document using a third-party application for messaging (e.g., Slack) might result in the messaging application being the highest scoring application. In some cases, the scoring service 314 is able to infer a highest scoring application based on the timing and order of a series of interaction events. In some cases, the scoring service 314 is able to identify a highest scoring application that is different from the applications that raised the considered interaction events. For example, a document editing event (e.g., via MICROSOFT WORD) followed by a portable document format (PDF) generation event (e.g., via ADOBE ACROBAT), followed by a messaging event (e.g., via SLACK) might be interpreted to mean that the document is ready for signing, and thus, the scoring service might designate a document signing application (e.g., DocuSign) as the highest scoring application.

The permissions service 316 is accessed by application recommendation engine 120 to filter the scored applications according to various permissions-based constraints. Specifically, permissions service 316 accesses certain information to determine which applications from the list of scored applications are valid for presentation to a user. Any applications deemed by permissions service 316 as not being valid for presentation are removed from consideration as a recommended application. An application might be deemed invalid for several reasons. For example, a particular user and/or enterprise associated with the user may not have access to the application. Furthermore, the then-current status (e.g., online, disabled, maintenance, hidden, published, unpublished, etc.) of an application may result in the application being ineligible as a recommended application. Moreover, a user may not be authorized to perform certain operations over a content object as specified by the application (e.g., a user with merely viewing privileges cannot edit using the application).

Other permissions information and/or criteria may be considered by permissions service 316 when filtering the scored applications. In some cases, the information the permissions service 316 accesses to perform the filtering operations is derived from the user attributes 342 in user profiles 332. In other cases, the information is derived from instances of application attributes 348 stored in an app registry 338 in storage devices 330. The app registry 338, for example, is initially populated when a third-party application is first integrated with content management system 350. Furthermore, application attributes 348 are continually updated as new information about the application is received. The app registry may include any application attributes or characteristics of the app, including but not limited to (a) the app author, (b) the version of the app, (c) the version of the integration, (d) a history of changes, etc. Any of the foregoing characteristics of an app can be used in any operation or operations for making recommendations.

The foregoing graphing, scoring, filtering, and other operations serve to identify a set of recommended applications 116k at application recommendation engine 120. The recommended applications 116k are then accessed by display generator 318 to generate the user interface display elements that comprise an active, visual presentation of the recommended applications. Specifically, and as is shown by the representative set of application display components 328, a particular application from recommended applications 116K might be visually represented in a user interface by an icon having a respective underlying hyperlink (e.g., to launch the application). The user interface display elements and other information associated with the recommended applications are codified in instances of messages 322 and delivered to the users. As an example, sets of recommended applications are dynamically generated and presented to respective users in their corresponding instances of the native application. Interaction events associated with the selection (e.g., app icon click) of applications by users at the native application are received as instances of messages 322 at content management server 108.

The foregoing discussions include techniques for recording interaction events over users and/or content objects at third-party applications (e.g., step 222 of FIG. 2), which techniques are disclosed in further detail as follows.

Figure 4:
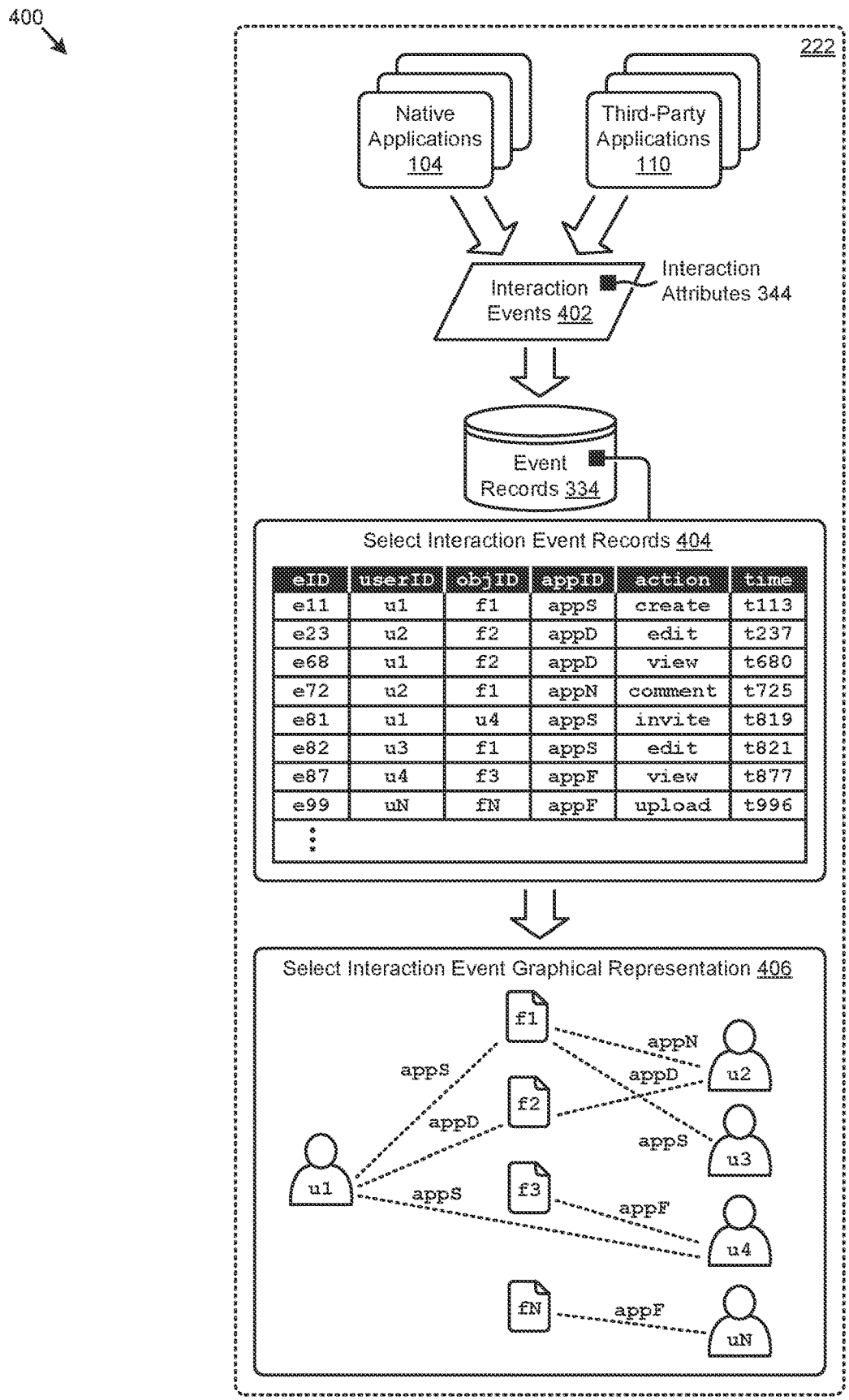
FIG. 4 depicts an application activity recording technique as implemented in systems that make recommendations of applications to users, according to an embodiment.

FIG. 4 depicts an application activity recording technique 400 as implemented in systems that make recommendations of applications to users. As an option, one or more variations of application activity recording technique 400 or any aspect thereof may be implemented in the context of the architecture and functionality of the embodiments described herein. The application activity recording technique 400 or any aspect thereof may be implemented in any environment.

FIG. 4 illustrates techniques for analyzing application usage activity to dynamically determine a set of applications that are recommended for particular users and/or particular content objects. Specifically, the figure is presented to describe one embodiment of a flow and data structure for recording and accessing interaction attributes pertaining to interaction events over users and/or content objects at a plurality of applications, including third-party applications. As depicted in the figure, the flow is associated with step 222 of FIG. 2.

As shown, instances of interaction events 402 (e.g., user-to-user interactions, user-to-content interactions, etc.) that occur at a plurality of native applications 104 or a plurality of third-party applications 110 are captured in event records 334. As indicated by a set of select interaction event records 404, the interaction attributes 344 that are associated with interaction events 402 can be organized into event records 334 in a tabular structure. Specifically, the columns in the table correspond to the interaction attributes recorded for each interaction event depicted in select interaction event records 404. For example, the select data indicate that an interaction event identified as "e68" corresponds to a user "u1" viewing (e.g., "act ion=view") an object "f2" at time "t680" using application "appD". Another event "e81" corresponds to user "u1" inviting (e.g., "action=invite") a user "u4" (e.g., to join a collaboration group, to collaborate on a content object, etc.) at time "t 819" using application "appS".

The interact events codified in select interaction event records 404 can be logically represented in a select interaction event graphical representation 406. As shown, select interaction event graphical representation 406 comprises nodes (e.g., points, vertices, etc.) that correspond to users (e.g., "u1", "u2", "u3", "u4", and "uN") or content objects (e.g., "f1", "f2", "f3", and "fN"). The edges (e.g., arcs, lines, etc.) between the nodes represent the pairwise relationships between the nodes (e.g., users, content objects). Such object relationships can have certain characteristics and/or attributes associated with them. For example, and as indicated in the figure, the object relationships are associated with at least the "appID" attribute (e.g., "appS" "appD" "appF" and "appN" of the corresponding interaction event.

The select interaction event graphical representation 406 illustrates how certain applications that are associated with a particular user and/or content object and/or content object type might identified. Specifically, considering user "u1" as the subject user, the select interaction event graphical representation 406 might be constructed from the recorded interaction events associated with user "u1" (e.g., directly or at other levels of separation) to facilitate determining a set of recommended applications for user "u1". In some cases, a particular interaction event can be associated with a particular subject user due to interaction events that were raised by users other than the particular subject user. This can happen, for example if the particular subject user is associated (e.g., included in a collaboration group) with other users.

Further details pertaining to techniques for constructing such graphs according to the herein disclosed techniques (e.g., step 224 of FIG. 2) are disclosed as follows.

Figure 5:
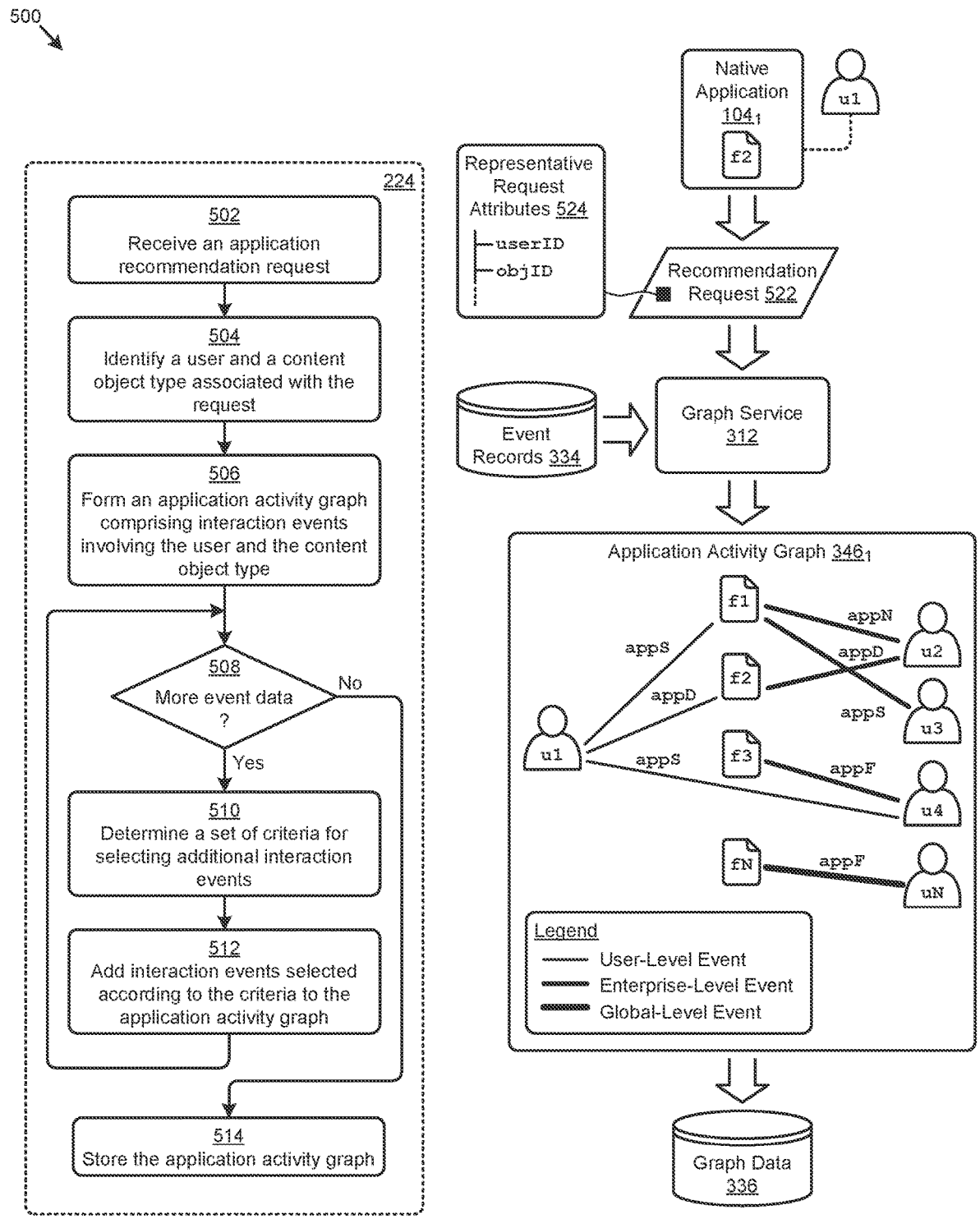
FIG. 5 presents an application activity graph generation technique as implemented in systems that make recommendations of applications to facilitate a user's interactions with content objects, according to an embodiment.

FIG. 5 presents an application activity graph generation technique 500 as implemented in systems that make recommendations of applications to facilitate a user's interactions with content objects. As an option, one or more variations of application activity graph generation technique 500 or any aspect thereof may be implemented in the context of the architecture and functionality of the embodiments described herein. The application activity graph generation technique 500 or any aspect thereof may be implemented in any environment.

FIG. 5 illustrates aspects pertaining to analyzing application usage activity to dynamically determine a set of applications that are recommended for particular users and/or particular content objects. Specifically, the figures are presented to illustrate one embodiment of certain steps and/or operations that facilitate constructing application activity graphs from interaction events performed at a plurality of applications. As depicted in the figure, the steps and/or operations are associated with step 224 of FIG. 2. A representative scenario is also shown in the figures to illustrate an example application of application activity graph generation technique 500.

The application activity graph generation technique 500 commences by receiving an application recommendation request (step 502). As illustrated, a recommendation request 522 might be invoked from a native application 1041 in response to user "u1" viewing the file "f 2" in the application. A user and a content object type associated with the recommendation request are identified (step 504). As can be observed in a set of representative request attributes 524, recommendation request 522 might comprise a user identifier (e.g., stored in a "userID" field), a content object identifier (e.g., stored in an "objID" field), and/or other request attributes. The content object identifier can be used to, for example, query the object attributes (e.g., metadata) of the content object datastore to determine the content object type (e.g., PDF) of file "f2".

An application activity graph comprising interaction events that involve the user and the content object type is formed (step 506). As an example, graph service 312 might access the event records 334 to initially populate an application activity graph $346_1$ with a set of "user-level events". As can be observed, each "user-level event" in application activity graph $346_1$ represents an interaction event from event records 334 that involves user "u1" and the example PDF files (e.g., file "f1" and file "f2"). In some cases, the interaction event is a user-to-user event (e.g., user "u1" interacts with user "u4") with no direct interaction over a content object.

If more event data is to be added to the application activity graph ("Yes" path of decision 508), a set of criteria for selecting additional information is determined (step 510). For example, interaction events that involve interactions over the example PDF files by other users in the enterprise that comprises user "u1" might also be considered. The interaction events selected according to the foregoing criteria are added to the application activity graph (step 512). Specifically, the interaction events designated as an "enterprise-level event" are added to application activity graph $346_1$. As can be observed, a set of "global-level event" data may also be added to application activity graph $346_1$. Such "global-level event" data involves interactions over a content object (e.g., the example PDF file "fN") by any user who is considered to be external to the aforementioned enterprise.

When no more event data is needed ("No" path of decision 508), the application activity graph is stored (e.g., in graph data 336) for further processing (step 514).

The foregoing discussions include techniques for analyzing such application activity graphs to determine sets of recommended applications (e.g., step 226 of FIG. 2), which techniques are disclosed in further detail as follows.

Figure 6:
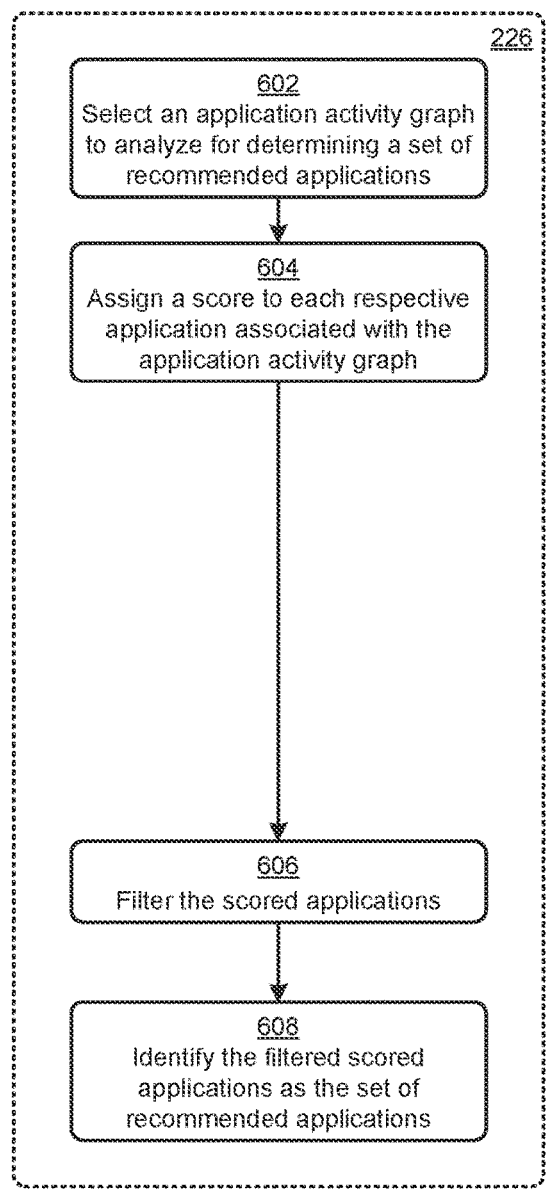
FIG. 6 presents a recommended application selection technique as implemented in systems that make recommendations of applications to facilitate a user's interactions with content objects, according to an embodiment.
Figure 6:
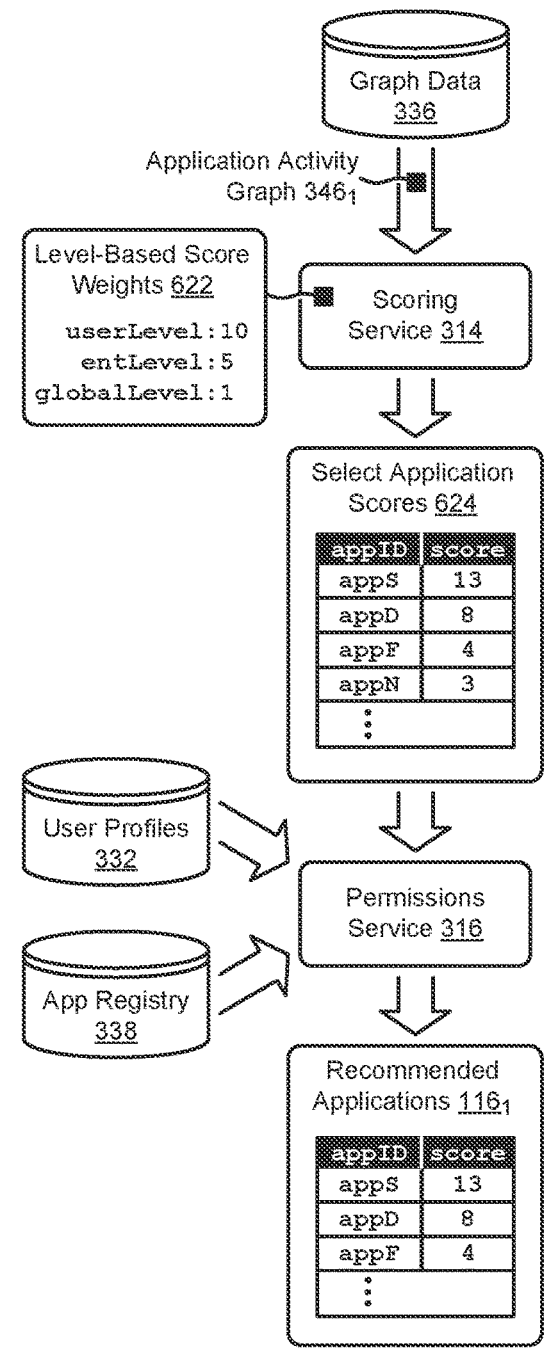

FIG. 6 presents a recommended application selection technique 600 as implemented in systems that make recommendations of applications to facilitate a user's interactions with content objects. As an option, one or more variations of recommended application selection technique 600 or any aspect thereof may be implemented in the context of the architecture and functionality of the embodiments described herein. The recommended application selection technique 600 or any aspect thereof may be implemented in any environment.

FIG. 6 illustrates techniques for analyzing application usage activity to dynamically determine a set of applications that are recommended for particular users and/or particular content objects. Specifically, the figures are presented to illustrate one embodiment of certain steps and/or operations that facilitate analyzing application activity graphs to determine sets of recommended applications. As depicted in the figure, the steps and/or operations are associated with step 226 of FIG. 2. A representative scenario is also shown in the figures to illustrate an example application of recommended application selection technique 600.

The recommended application selection technique 600 commences by selecting an application activity graph to analyze so as to determine a set of recommended applications (step 602). As illustrated, the application activity graph $346_1$ earlier described in FIG. 5 might be selected from graph data 336. A score is assigned to each respective application associated with the application activity graph (step 604). For example, an instance of scoring service 314 might process the application activity graph $346_1$ to produce at least the application scores shown in a set of select application scores 624. The scores assigned by scoring service 314 are quantitative measures of the relevancy of the applications comprising the application activity graph.

One approach to establishing scores that reflect the relevancy of the applications involves weighting the scores attributed to an application in accordance with the level or degree of separation of the interaction events from a subject user. Specifically, and as depicted in a set of level-based score weights 622, each user-level interaction event would attribute a score of "10" to the application associated with that event, each enterprise-level interaction event would attribute a score of "5" to the application associated with that event, and each global-level interaction event would attribute a score of "1" to the application associated with that event. The select application scores 624 reflect the foregoing weighted scoring approach as applied to the applications (e.g., "apps", "appD", "appF", and "appN") comprising application activity graph $346_1$. With this approach, the application with the highest score would be considered the "most relevant" application to recommend.

Further details regarding general approaches to forming and maintaining an activity graph are described in U.S. application Ser. No. 16/154,679 titled "ON-DEMAND COLLABORATION USER INTERFACES", filed on Oct. 8, 2018, which is hereby incorporated by reference in its entirety.

According to the recommended application selection technique 600, the scored applications are then filtered (step 606). As illustrated, an instance of permissions service 316 earlier described might analyze some (e.g., the top N) or all of the scored applications to determine which applications from the scored applications are valid for presentation to a user. In some cases, permissions service 316 might access the user profiles 332 to identify any permissions constraints of the user (e.g., user "u1") that affect the scored applications. Such constraints might pertain to the user not having access to certain applications and/or the user not being authorized to perform certain operations specified by certain applications.

A user may also be restricted by certain enterprise-wide application and/or content object permissions. Permissions service 316 may also access the app registry 338 to identify permissions constraints associated with the scored applications. These constraints might pertain to the then-current availability and/or status (e.g., online, disabled, maintenance, hidden, published, unpublished, etc.) of an application, or the required content object permissions associated with an application. The filtered set of scored applications is identified as the set of recommended applications (step 608). As depicted, the application "appN" that is included in the select application scores 624 has been eliminated (e.g., by permissions service 316) from the set of recommended applications $116_1$.

The foregoing discussions include techniques for presenting the recommended applications to various users (e.g., step 228 of FIG. 2), which techniques are disclosed in further detail as follows.

Figure 7:
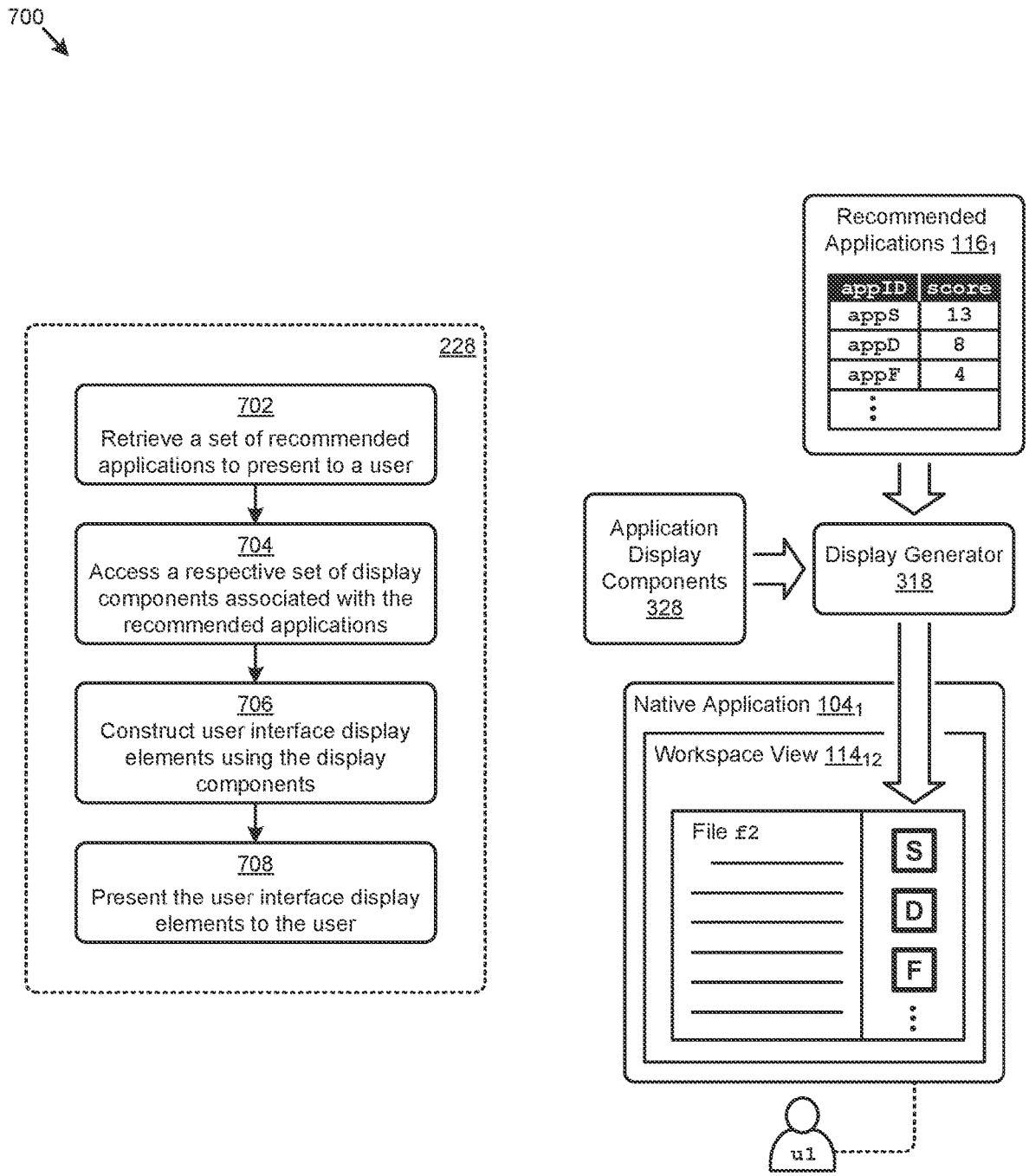
FIG. 7 depicts a recommended application presentation technique as implemented in systems that make recommendations of applications to facilitate a user's interactions with content objects, according to an embodiment.

FIG. 7 depicts a recommended application presentation technique 700 as implemented in systems that make recommendations of applications to facilitate a user's interactions with content objects. As an option, one or more variations of recommended application presentation technique 700 or any aspect thereof may be implemented in the context of the architecture and functionality of the embodiments described herein. The recommended application presentation technique 700 or any aspect thereof may be implemented in any environment.

FIG. 7 illustrates techniques for analyzing application usage activity to dynamically determine a set of applications that are recommended for particular users and/or particular content objects. Specifically, the figures are presented to illustrate one embodiment of certain steps and/or operations that facilitate presenting recommended applications to a user. As depicted in the figure, the steps and/or operations are associated with step 228 of FIG. 2. A representative scenario is also shown in the figures to illustrate an example application of recommended application presentation technique 700.

The recommended application presentation technique 700 commences by retrieving a set of recommended applications to present to a user (step 702). As illustrated, an instance of display generator 318 might retrieve the set of recommended applications $116_1$ earlier described. A set of display components respectively associated with the recommended applications is accessed (step 704). As shown, display generator 318 accesses the application display components 328 to identify certain components (e.g., icons, hyperlinks, etc.) associated with the applications (e.g., "apps", "appD", and "appF") comprising recommended applications $116_1$. For example, application display components 328 indicates that application "apps" is represented by a square icon identified by the capital letter "S", application "appD" is represented by a square icon identified by the capital letter "D" in it, and application "appF" is represented by a square icon identified by the capital letter "F".

Certain user interface display elements are constructed from the display components associated with dynamically-determined recommended applications (step 706). As an example, display generator 318 might access a user interface library (e.g., React library) to generate the code for rendering the display components of the recommended applications, which display components are then presented in a user interface. The user interface display elements are then dynamically-populated into the target user interface for presentation to the user (step 708). As illustrated, the target user interface might be a workspace view $114_{12}$ of native application $104_1$ associated with user "u1".

As can be seen, the operations of step 702 through step 708 address the problem of how to dynamically-populate a user interface so as to facilitate a user's quick access to third-party applications that have been used by that user's co-collaborators.

In some cases, a dynamically-populated user interface includes several panels and/or decorations. Strictly as examples, a user interface screen or modal might include a decoration in the form of a co-collaborator's avatar that is positioned near a recommended application icon. Additionally or alternatively, a user interface screen or modal might include a co-collaborator's avatar that pops-up based on a hovering action, or touching action, or screen pressing action, or other user interaction with a displayed application icon. Additionally or alternatively, a user interface screen might include a user-specific feed activity panel that is positioned next to an ordered array of recommended application icons.

Additional Embodiments of the Disclosure

Additional Practical Application Examples

Figure 8:
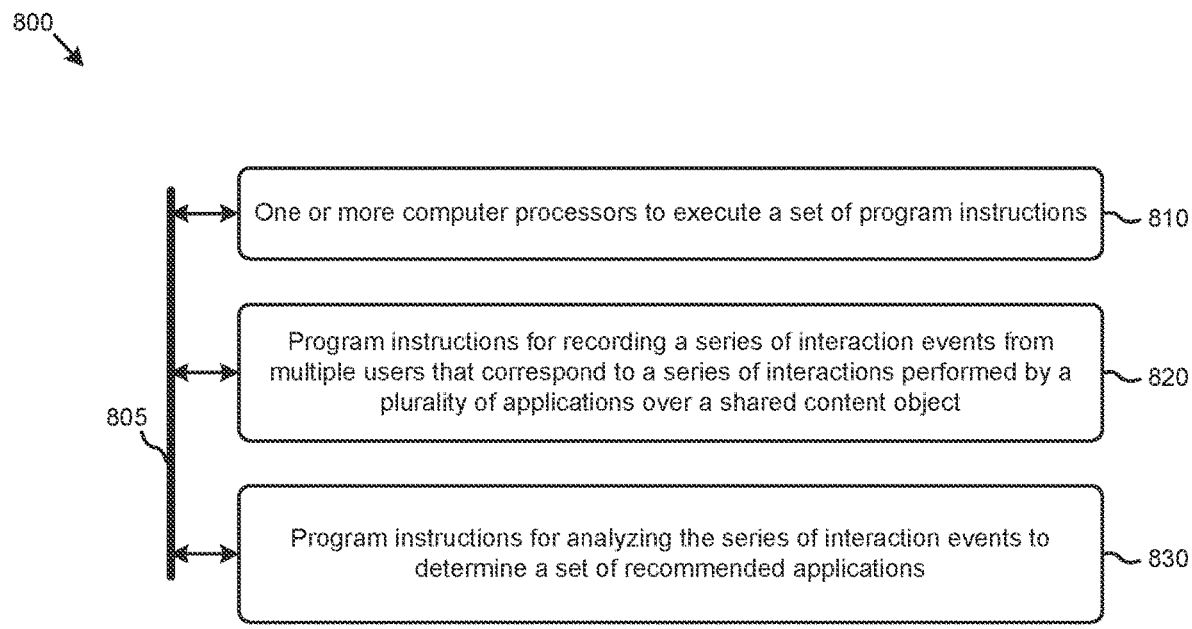
FIG. 8 depicts system components as arrangements of computing modules that are interconnected so as to implement certain of the herein-disclosed embodiments.

FIG. 8 depicts a system 800 as an arrangement of computing modules that are interconnected so as to operate cooperatively to implement certain of the herein-disclosed embodiments. This and other embodiments present particular arrangements of elements that, individually or as combined, serve to form improved technological processes that address identifying one or more applications from a large corpus of available applications to perform operations over certain content objects. The partitioning of system 800 is merely illustrative and other partitions are possible. As an option, the system 800 may be implemented in the context of the architecture and functionality of the embodiments described herein. Of course, however, the system 800 or any operation therein may be carried out in any desired environment. The system 800 comprises at least one processor and at least one memory, the memory serving to store program instructions corresponding to the operations of the system. As shown, an operation can be implemented in whole or in part using program instructions accessible by a module. The modules are connected to a communication path 805, and any operation can communicate with any other operations over communication path 805. The modules of the system can, individually or in combination, perform method operations within system 800. Any operations performed within system 800 may be performed in any order unless as may be specified in the claims. The shown embodiment implements a portion of a computer system, presented as system 800, comprising one or more computer processors to execute a set of program code instructions (module 810) and modules for accessing memory to hold program code instructions to perform: recording a series of interaction events from multiple users that correspond to a series of interactions performed by a plurality of applications over a shared content object (module 820); and analyzing the series of interaction events to determine a set of recommended applications (module 830).

System Architecture Overview

Additional System Architecture Examples

Figure 9A:
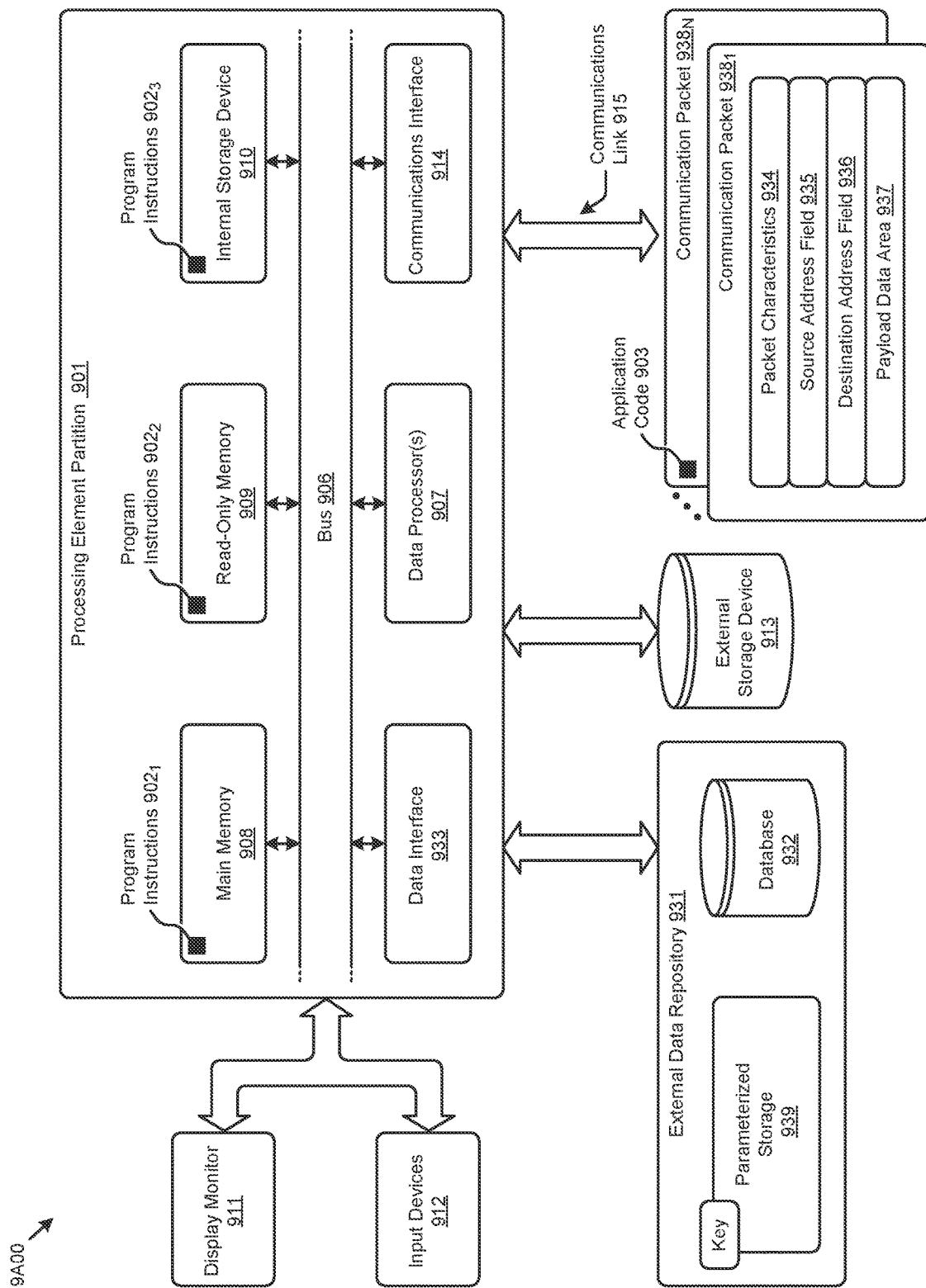
FIG. 9A and FIG. 9B present block diagrams of computer system architectures having components suitable for implementing embodiments of the present disclosure, and/or for use in the herein-described environments.

FIG. 9A depicts a block diagram of an instance of a computer system 9A00 suitable for implementing embodiments of the present disclosure. Computer system 9A00 includes a bus 906 or other communication mechanism for communicating information. The bus interconnects subsystems and devices such as a central processing unit (CPU), or a multi-core CPU (e.g., data processor 907), a system memory (e.g., main memory 908, or an area of random access memory (RAM)), a non-volatile storage device or non-volatile storage area (e.g., read-only memory 909), an internal storage device 910 or external storage device 913 (e.g., magnetic or optical), a data interface 933, a communications interface 914 (e.g., PHY, MAC, Ethernet interface, modem, etc.). The aforementioned components are shown within processing element partition 901, however other partitions are possible. Computer system 9A00 further comprises a display 911 (e.g., CRT or LCD), various input devices 912 (e.g., keyboard, cursor control), and an external data repository 931.

According to an embodiment of the disclosure, computer system 9A00 performs specific operations by data processor 907 executing one or more sequences of one or more program instructions contained in a memory. Such instructions (e.g., program instructions $902_1$, program instructions $902_2$, program instructions $902_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 9A00 performs specific networking operations using one or more instances of communications interface 914. Instances of communications interface 914 may comprise one or more networking ports that are configurable (e.g., pertaining to speed, protocol, physical layer characteristics, media access characteristics, etc.) and any particular instance of communications interface 914 or port thereto can be configured differently from any other particular instance. Portions of a communication protocol can be carried out in whole or in part by any instance of communications interface 914, and data (e.g., packets, data structures, bit fields, etc.) can be positioned in storage locations within communications interface 914, or within system memory, and such data can be accessed (e.g., using random access addressing, or using direct memory access DMA, etc.) by devices such as data processor 907.

Communications link 915 can be configured to transmit (e.g., send, receive, signal, etc.) any types of communications packets (e.g., communication packet $938_1$, communication packet $938_N$) comprising any organization of data items. The data items can comprise a payload data area 937, a destination address 936 (e.g., a destination IP address), a source address 935 (e.g., a source IP address), and can include various encodings or formatting of bit fields to populate packet characteristics 934. In some cases, the packet characteristics include a version identifier, a packet or payload length, a traffic class, a flow label, etc. In some cases, payload data area 937 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 907 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 931, which in turn can be formatted into any one or more storage areas, and which can comprise parameterized storage 939 accessible by a key (e.g., filename, table name, block address, offset address, etc.).

Execution of the sequences of instructions to practice certain embodiments of the disclosure are performed by a single instance of a computer system 9A00. According to certain embodiments of the disclosure, two or more instances of computer system 9A00 coupled by a communications link 915 (e.g., LAN, public switched telephone network, or wireless network) may perform the sequence of instructions required to practice embodiments of the disclosure using two or more instances of components of computer system 9A00.

Computer system 9A00 may transmit and receive messages such as data and/or instructions organized into a data structure (e.g., communications packets). The data structure can include program instructions (e.g., application code 903), communicated through communications link 915 and communications interface 914. Received program instructions may be executed by data processor 907 as it is received and/or stored in the shown storage device or in or upon any other non-volatile storage for later execution. Computer system 9A00 may communicate through a data interface 933 to a database 932 on an external data repository 931. Data items in a database can be accessed using a primary key (e.g., a relational database primary key).

Processing element partition 901 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 907. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to recommending applications to facilitate a user's interactions with content objects. A module may include one or more state machines and/or combinational logic used to implement or facilitate the operational and/or performance characteristics pertaining to recommending applications to facilitate a user's interactions with content objects.

Various implementations of database 932 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of recommending applications to facilitate a user's interactions with content objects). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to recommending applications to facilitate a user's interactions with content objects, and/or for improving the way data is manipulated when performing computerized operations pertaining to analyzing application usage activity to dynamically determine a set of applications that are recommended for a particular user and/or a particular content object.

Figure 9B:
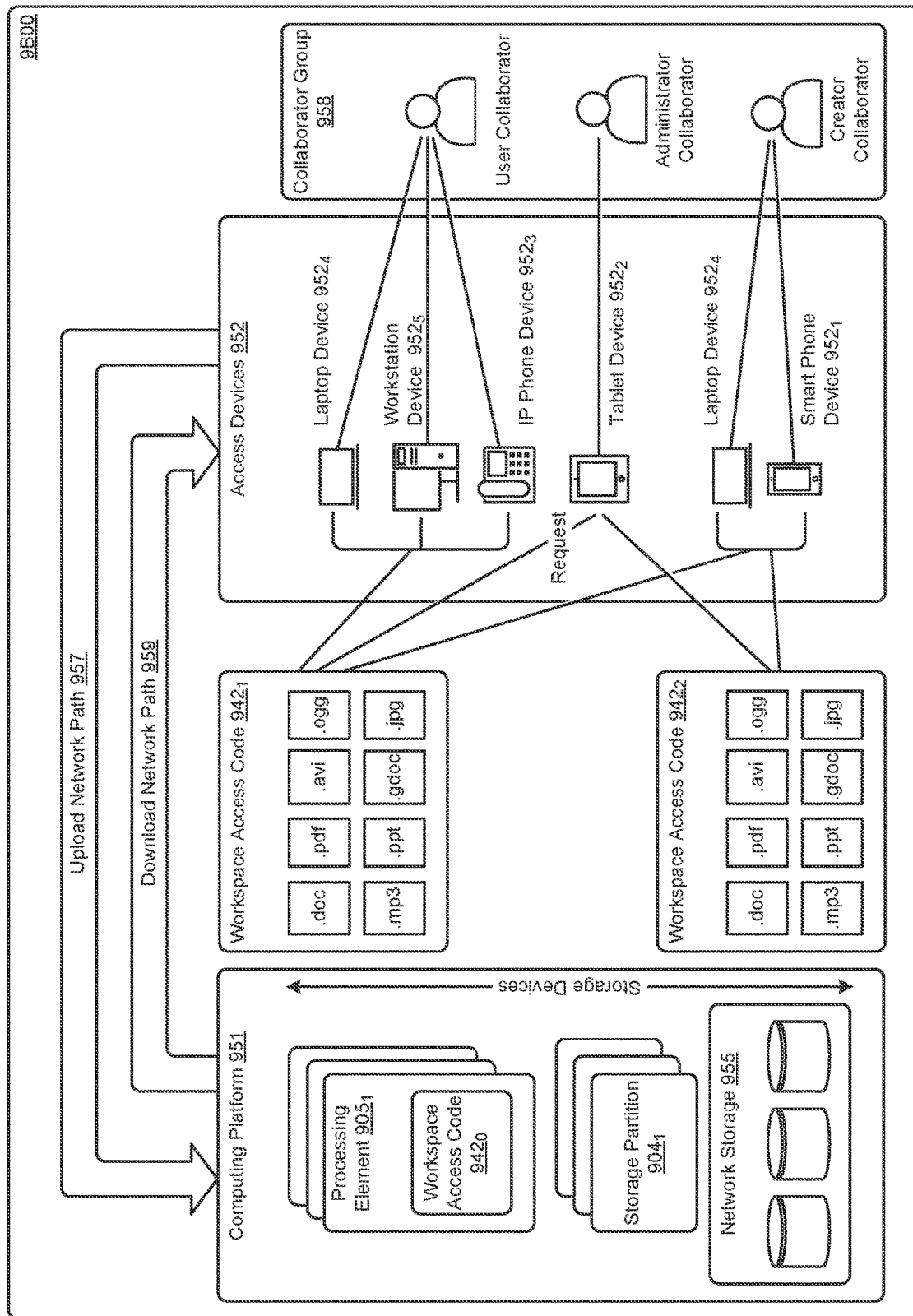

FIG. 9B depicts a block diagram of an instance of a cloud-based environment 9B00. Such a cloud-based environment supports access to workspaces through the execution of workspace access code (e.g., workspace access code 942$_0$, workspace access code 942$_1$, and workspace access code 942$_2$). Workspace access code can be executed on any of access devices 952 (e.g., laptop device 952$_4$, workstation device 952$_5$, IP phone device 952$_3$, tablet device 952$_2$, smart phone device 952$_1$, etc.), and can be configured to access any type of object. Strictly as examples, such objects can be folders or directories or can be files of any filetype. A group of users can form a collaborator group 958, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 951, including in a middleware setting. As shown, a portion of the workspace access code resides in and can be executed on one or more processing elements (e.g., processing element $905_1$). The workspace access code can interface with storage devices such as networked storage 955. Storage of workspaces and/or any constituent files or objects, and/or any other code or scripts or data can be stored in any one or more storage partitions (e.g., storage partition $904_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 957). A stored workspace can be delivered to a particular user and/or shared with other particular users via a download (e.g., a download from a processing element to an access device over a download network path 959).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for determining activity-based application recommendations by a content management system, the method comprising:
   maintaining a plurality of shared content objects at the content management system, wherein the plurality of shared content objects are accessible to a plurality of users and are to be operated over by a plurality of applications;
   recording interaction events representing interactions between respective users of the plurality of users and respective shared content objects of the plurality of shared content objects, the interactions using one or more applications of the plurality of applications;
   receiving a request associated with a shared content object of the plurality of shared content objects and a user of the plurality of users; and
   processing, in response to receipt of the request, the interaction events to determine a recommended application of the plurality of applications to use to interact with the shared content object, wherein the recommended application is determined based on at least the user and interaction events representing use of the recommended application to interact with the shared content object by respective users of the plurality of users.

2. The method of claim 1, wherein the recommended application is presented in a dynamically-populated user interface.

3. The method of claim 1, wherein the recommended application is determined based at least in part on scores assigned to two or more of the plurality of applications.

4. The method of claim 3, wherein the scores represent a quantitative measure of relevancy.

5. The method of claim 1, wherein the recommended application is determined based at least in part on one or more permissions constraints, the one or more permissions constraints corresponding to at least one of, at least one user, or at least one of the plurality of applications, or the shared content object.

6. The method of claim 1, wherein the recommended application is determined based at least in part on an application activity graph, the application activity graph being constructed from at least a portion of the interaction events.

7. The method of claim 1, wherein an application programming interface (API) is accessed by at least one of the plurality of applications to record at least some of the interaction events.

8. The method of claim 1, wherein a graph service is used to retrieve at least some of the interaction events.

9. The method of claim 1, wherein the interaction events from the plurality of users comprises at least one user-to-user interaction and at least one user-to-content interaction.

10. The method of claim 1, wherein the interaction events correspond to an older timestamped interaction event followed in a series of later timestamped interaction event.

11. A non-transitory computer readable medium having stored thereon a sequence of instructions which, when stored in memory and executed by a processor causes a set of acts for determining activity-based application recommendations by a content management system, the set of acts comprising:
   maintaining a plurality of shared content objects at the content management system, wherein the plurality of shared content objects are accessible to a plurality of users and are to be operated over by a plurality of applications;
   recording interaction events representing interactions between respective users of the plurality of users and respective shared content objects of the plurality of shared content objects, the interactions using one or more applications of the plurality of applications;
   receiving a request associated with a shared content object of the plurality of shared content objects and a user of the plurality of users; and
   processing, in response to receipt of the request, the interaction events to determine a recommended application of the plurality of applications to use to interact with the shared content object, wherein the recommended application is determined based on at least the user and interaction events representing use of the recommended application to interact with the shared content object by respective users of the plurality of users.

12. The non-transitory computer readable medium of claim 11, wherein the recommended application is presented in a dynamically-populated user interface.

13. The non-transitory computer readable medium of claim 11, wherein the recommended application is determined based at least in part on scores assigned to two or more of the plurality of applications.

14. The non-transitory computer readable medium of claim 13, wherein the scores represent a quantitative measure of relevancy.

15. The non-transitory computer readable medium of claim 11, wherein the recommended application is determined based at least in part on one or more permissions constraints, the one or more permissions constraints corresponding to at least one of, at least one user, or at least one of the plurality of applications, or the shared content object.

16. The non-transitory computer readable medium of claim 11, wherein the recommended application is determined based at least in part on an application activity graph, the application activity graph being constructed from at least a portion of the interaction events.

17. The non-transitory computer readable medium of claim 11, wherein an application programming interface (API) is accessed by at least one of the plurality of applications to record at least some of the interaction events.

18. The non-transitory computer readable medium of claim 11, wherein a graph service is used to retrieve at least some of the interaction events.

19. A system for determining activity-based application recommendations by a content management system, the system comprising:
　a storage medium having stored thereon a sequence of instructions; and
　one or more processors that execute the sequence of instructions to cause the one or more processors to perform a set of acts, the set of acts comprising,
　　maintaining a plurality of shared content objects at the content management system, wherein the plurality of shared content objects are accessible to a plurality of users and to be operated over by a plurality of applications;
　　recording interaction events representing interactions between respective users of the plurality of users and respective shared content objects of the plurality of shared content objects, the interactions using one or more applications of the plurality of applications;
　　receiving a request associated with a shared content object of the plurality of shared content objects and a user of the plurality of users; and
　　processing, in response to receipt of the request, the interaction events to determine a recommended application of the plurality of applications to use to interact with the shared content object, wherein the recommended application is determined based on at least the user and interaction events representing use of the recommended application to interact with the shared content object by respective users of the plurality of users.

20. The system of claim 19, wherein the recommended application is presented in a dynamically-populated user interface.

\* \* \* \* \*